US005525238A

United States Patent [19]

Menke

[11] Patent Number: 5,525,238

[45] Date of Patent: Jun. 11, 1996

[54] APPARATUS AND PROCESS FOR SEPARATING SUBSTANCES

[76] Inventor: Lucas Menke, Prälat-Zistl-Strasse 12, 80331 München, Germany

[21] Appl. No.: 380,402

[22] Filed: Jan. 30, 1995

[30] Foreign Application Priority Data

Feb. 25, 1994 [DE] Germany .......................... 44 06 239.7

[51] Int. Cl.$^6$ .................................................. C02F 1/24

[52] U.S. Cl. ......................... 210/703; 210/805; 210/712; 210/194; 210/221.2

[58] Field of Search ................................ 210/703, 221.2, 210/805, 194, 205, 221.1, 707, 525, 532.1, 712

[56] References Cited

U.S. PATENT DOCUMENTS

| | | |
|---|---|---|
| 2,568,452 | 9/1951 | Kelly . |
| 2,920,763 | 1/1960 | Lind . |
| 3,015,396 | 1/1962 | Quast . |
| 3,117,082 | 1/1964 | Schluter . |
| 3,246,763 | 4/1966 | Bauer . |
| 3,418,236 | 12/1968 | Mail . |
| 3,809,240 | 5/1974 | Savall . |
| 3,820,659 | 6/1974 | Parlette . |
| 4,022,696 | 5/1977 | Krofta . |
| 4,160,737 | 7/1979 | Pickenvood . |
| 4,572,786 | 2/1986 | Endo . |
| 5,068,031 | 11/1991 | Wang . |
| 5,176,835 | 1/1993 | Perletti . |

FOREIGN PATENT DOCUMENTS

| | | |
|---|---|---|
| 228396 | 7/1987 | European Pat. Off. . |
| 0406048 | 1/1991 | European Pat. Off. . |
| 442463 | 8/1991 | European Pat. Off. . |
| 1536599 | 7/1968 | France . |
| 2713088 | 9/1977 | Germany . |
| 291768 | 7/1991 | Germany . |
| WO87/00220 | 1/1987 | WIPO . |

OTHER PUBLICATIONS

B. Eppler, Flotation als Modernes Verfahren in industriellen und kommunalen Klaeranlagen, 3R International, Apr. 1993, pp. 210–215.

*Primary Examiner*—Thomas M. Lithgow
*Attorney, Agent, or Firm*—Foley & Lardner

[57] ABSTRACT

An apparatus and a process for separating substances from an influent fluid by means of dissolved-gas flotation, in which a flotation tank has at least one fixed fluid inlet for the influent fluid and at least one mixture inlet for a fluid-gas mixture. Associated with the mixture inlet is a depressurization element for at least partial decompression of the fluid-gas mixture directly into the flotation tank, with the depressurization element being arranged essentially below the influent liquid inlet. The essential advantages of the invention are that, owing to the direct decompression directly below the flow of the influent liquid, a more efficient flotation process is effected. The losses after decompression can be kept low, and the gas bubbles formed can be immediately employed for flotation.

12 Claims, 4 Drawing Sheets

VIEWING DIRECTION A:

APPARATUS AND PROCESS FOR SEPARATING SUBSTANCES

FIELD OF THE INVENTION

The invention relates to an apparatus and a process for separating substances from a fluid by means of dissolved-gas flotation.

BACKGROUND OF THE INVENTION

A very wide variety of industrial apparatus and processes are known for separating solid and liquid phase by means of dissolved-gas flotation. These involve dissolving a gas under elevated pressure in the fluid from which the substances are to be separated. After a certain residence time, the saturated mixture is decompressed to a lower pressure, which gives rise to gas supersaturation of the liquid medium and the gas no longer dissolved being liberated in the form of fine microbubbles.

After the addition of precipitation and flocculation aids, the solid substances to be separated are converted from the fluid into a floccular form, and the suspension thus already pretreated is further mixed with the decompressed fluid-gas mixture and then fed to a flotation tank. The mixture of fluid and gas bubbles is then fed to a flotation tank in which the flotation of the solid-flocculae composites to be separated takes place. Rectangular and round types of construction are known for the flotation tanks, various inflow geometries, for round flotation tanks, being employed which can in principle be distinguished as follows:

EP-A-0 442 463 describes a generic apparatus in which the decompression of the fluid-gas mixture under elevated pressure takes place outside the flotation tank in the feeder for the fluid containing the particles to be separated, and the already decompressed mixture flows in radially upwards via a feeder in the center of the bottom section of the flotation tank.

DE-C-27 13 088 and EP-B-0 228 396 describe systems in which the feeder of the fluid-gas mixture is designed in the form of a radial inflow pipe revolving in the flotation tank. In this case it is essential for the entire mixture of the fluid containing the substances to be separated and the gas bubbles to flow together into the flotation tank. This may either involve the gas-saturated fluid under elevated pressure being admixed to the main stream in advance, with decompression and bubble formation, similar to the above-mentioned EP-A-0 442 463, or decompression and bubble formation takes place at the same time as the injection into the flotation tank, the injection orifices, however, revolving in the flotation tank as mentioned above.

These known above-mentioned systems have the following drawbacks. When the gas bubble stream is mixed into the main fluid stream containing the solids to be separated, inflow turbulences cannot be avoided, which results in shear force stresses of the solids to be separated conditioned as flocculae, and thus may increase the chemicals consumption of flocculants and flocculation aids. Moreover, decompression of the gas-saturated fluid-gas mixture in the process sequence takes place significantly earlier than the flotation (i.e. floating-up of the solids to be separated with the aid of the gas bubbles), which results in non-optimal efficiency, since the gas bubbles may, even before the flotation process, agglomerate to form larger bubbles, and/or may degas. This gives rise to increased process losses. Moreover, in the installations having a central stationary inlet and infeed of the gas mixture upstream of the inlet into the flotation tank, there forms, owing to the pressure difference, an essentially vertically directed flow, which leads to seething and results in an inadequate distribution of the gas bubbles in the boundary region of the flotation tank.

SUMMARY OF THE INVENTION

With the above problems in view, an object of the invention is to specify an apparatus and a process, respectively, for dissolved-gas flotation which avoids the above-mentioned drawbacks and provides improved separation of solids or lipophilic substances from the fluid in conjunction with reduced energy consumption of the entire apparatus.

Another object of the present invention is to provide a more effective flotation process.

A further object of the present invention is to prevent agglomeration of small bubbles in order to provide an improved utilization factor of the gas bubbles.

In accordances with the present invention, an apparatus for separating substances from a fluid by means of dissolved-gas flotation is provided which comprises a flotation tank which has at least one fixed fluid inlet for the fluid, and at least one mixture inlet for a fluid-gas mixture, wherein the at least one mixture inlet includes depressurization means for at least partial decompression of the fluid-gas mixture directly into the flotation tank and being arranged essentially below the fluid inlet positioned essentially centrically in the flotation tank.

The essential advantages of the invention are that, owing to the direct decompression in the flotation tank, there is caused, below the layer in which the fluid is flowing which is to be separated from substances, a more effective flotation process. The losses after decompression or supersaturation can therefore be kept low, and the gas bubbles formed can immediately be used for flotation. The type of the flow configuration is such that no turbulences are produced which impair the floccula structure of the pretreated wastewater, which ensures the lowest possible consumption of flocculant chemicals and thus reduces environmental pollution.

A further essential advantage of the invention is that agglomeration of small gas bubbles is prevented, since decompression does not, as in the conventional arrangements, take place upstream of the injection, of the fluid-to be separated, into the flotation tank. This results in an improved utilization factor of the gas bubbles formed. Moreover, only part of the fluid to be separated from the substances is compressed and saturated with gas and then decompressed directly in the flotation tank and used for gas bubble formation. Thus, losses are reduced in the entire flotation process.

A further advantage of the invention should be seen in the fact that improved supply to the boundary regions of the flotation zone can be achieved, owing to which an overall improvement in the separation can be achieved.

According to an advantageous embodiment of the invention, the fluid inlet is arranged centrally in the lower bottom zone of the flotation tank and has a mouth directed upwards, and above the mouth a baffle is arranged which causes deflection of the fluid flow in a radial direction. Thus, uniform injection of the fluid containing the solids and/or lipophilic substances can be achieved. Preferably, the mixture inlet has a mouth which causes an essentially radial flow egress of the fluid-gas mixture. Thus it is possible, particularly if the flotation tank is of circular shape, to ensure uniform distribution of the gas bubbles. Preferably, the mixture inlet has either an annular depressurization element at its mouth or a plurality of depressurization elements designed as ring segments at its mouth.

According to a further advantageous embodiment of the invention, further mixture inlet orifices are arranged concentrically outside the fluid inlet in the flotation tank. This design is particularly suitable for large flotation tanks since, owing to the buoyancy of the gas bubbles in the radially outer tank regions, the efficacy of flotation is reduced. This drawback is overcome by the additional gas injection.

A still further embodiment of the invention provides for the arrangement, above the mouth of the mixture inlet, of a baffle for the fluid-gas mixture. Thus, effective injection of the gas-fluid mixture decompressed directly when entering the flotation zone can be achieved. In the flotation zone, a radial two-layer flow directed outward from the center can be achieved, the bottom layer essentially containing the fluid-gas mixture and the top layer essentially containing the fluid. Preferably in this context, the two-layer flow is directed horizontally outward from the center.

The present invention is particularly suitable for treating wastewater. On the other hand, other fields of application are also possible such as, for example, in the brewing industry. In such cases the invention is not limited to the separation of solids from a liquid, but is equally suitable for removing lipophilic components such as oils, waxes etc.

DESCRIPTION OF THE DRAWINGS

The invention is described in more detail with reference to the appended drawings.

DESCRIPTION OF THE PREFERRED EMBODIMENTS

The following description of the preferred embodiment relates to the design of the invention for wastewater treatment, although this should not be seen as limiting the invention to this sector.

Figure 1:
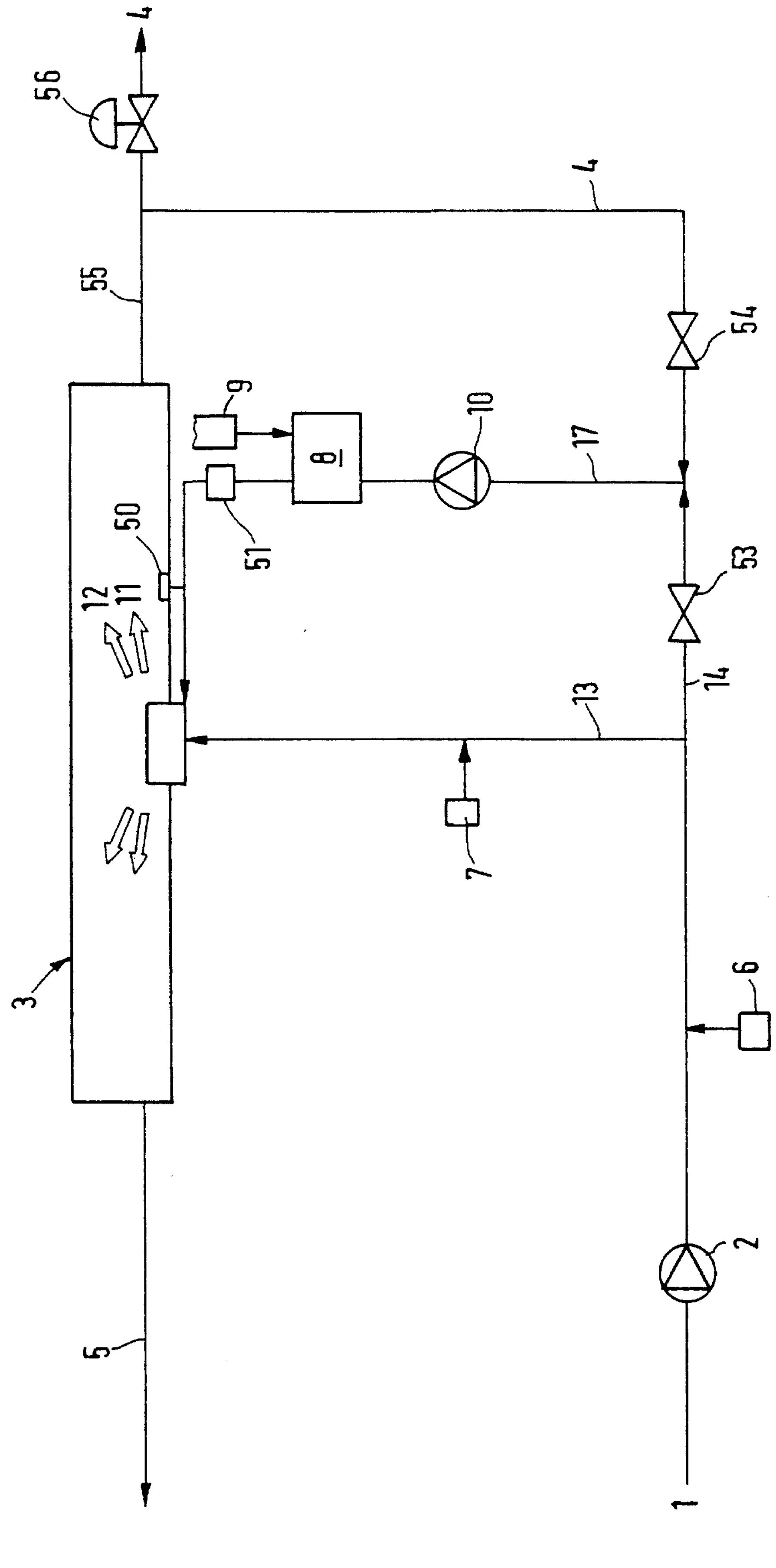
FIG. 1 shows a schematic diagram which illustrates the operating principle of the flotation apparatus.

The fluid to be separated from solids or lipophilic substances, preferably raw water 1, is pumped, as shown schematically in FIG. 1, by means of a pump 2 to the flotation apparatus 3 in which a solid and liquid phase are separated, so that two component streams are produced, namely the liquid, virtually solid-free clear phase 4 and the solid phase 5 which may also be designated as flotate and contains the major proportion of the solids. Upstream or downstream of the feed pump 2, one or more chemicals 6, 7 may be added for the purpose of precipitation and/or flocculation, which serve to convert dissolved or partially dissolved, colloidal and free solids into flocculate form. The raw water 1 thus pretreated is passed to the flotation apparatus 3.

In order to form gas bubbles, either a portion of the fluid to be fed in is passed via the valve 53, or a portion of the solid-free fluid is passed via the valve 54, to an appliance 8 where a gas 9 is injected, at a pressure which is preferably distinctly above ambient pressure, into the fluid and is dissolved therein. The pressure level required can be controlled via pump 10 and/or pump 2. The liquid phase containing the dissolved gas is introduced into the flotation apparatus 3 while the high pressure is maintained. In the flotation apparatus 3 itself, decompression takes place which results in supersaturation of the liquid with gas and causes fine microbubbles to be formed.

The decompression of the fluid-gas mixture and the flow control are carried out in such a way that there is formed, in the flotation apparatus 3, a preferably horizontal two-layer flow; in the lower or bottom zone a gas bubble flow 11 of the fluid-gas mixture, in the upper zone a raw-water flow 12 containing the solids in flocculated form. The gas bubbles formed can attach to the solids/flocculae to be separated and achieve separation of these by floating up (flotation).

In order to produce the gas-saturated fluid-gas mixture in the appliance 8 it is possible for both the raw water 1 in portions or as a whole, and a portion of the clear phase 4 to be supplied via thee pump 10 to the appliance 8 for the purpose of gas admixture. Metering in of the above-mentioned chemicals 6, 7 can be effected, individually or multiply depending on the application, upstream or downstream of the tap 13 of a possible raw-water component stream 14 to the pump 10.

The outflow line 55 from the flotation apparatus 3 is provided with a level control valve 56, in order to keep the liquid level in the flotation apparatus 3 constant.

Figure 2:
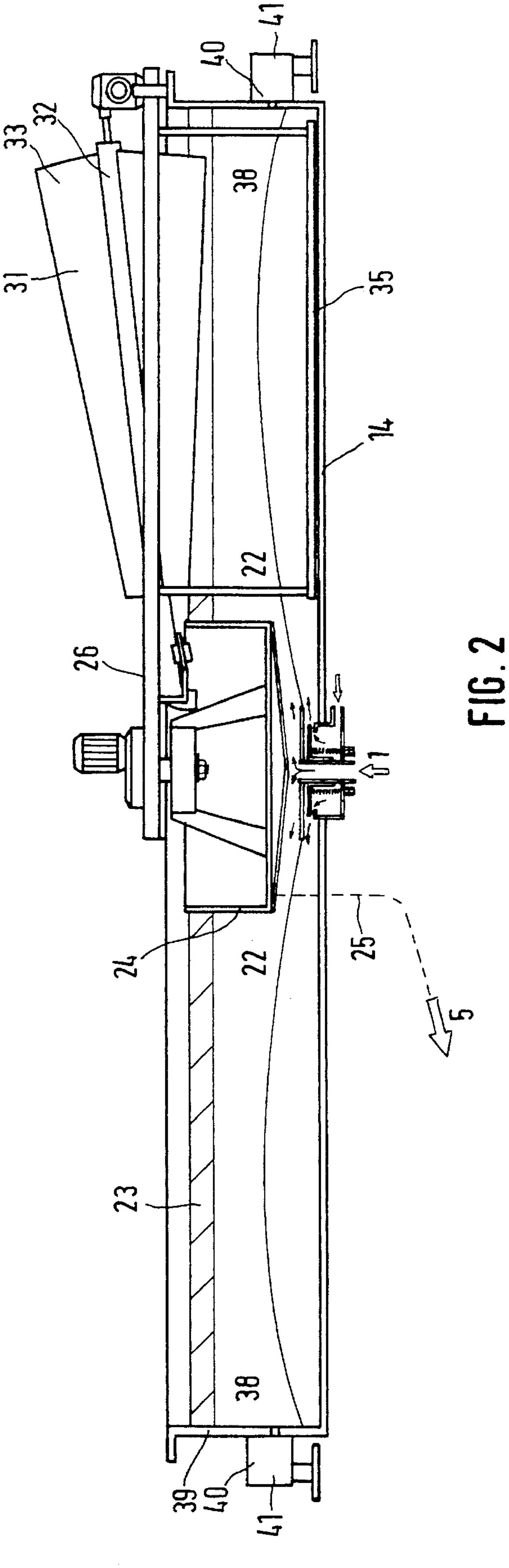
FIG. 2 is a longitudinal section of the flotation tank with inflow appliance and skimming appliance.

As shown in FIG. 2, the flotation apparatus 3 employed preferably is a circular flotation tank 14 having an approximately flat bottom and vertical outer walls. Diameter and overall height of the flotation tank 14 are chosen as a function of the particular application, degree of separation desired, amount of solid and hydraulic load. Generally, the diameter varies between 10 feet and 60 feet and the height is somewhere between 2 and 10 feet.

Figure 3:
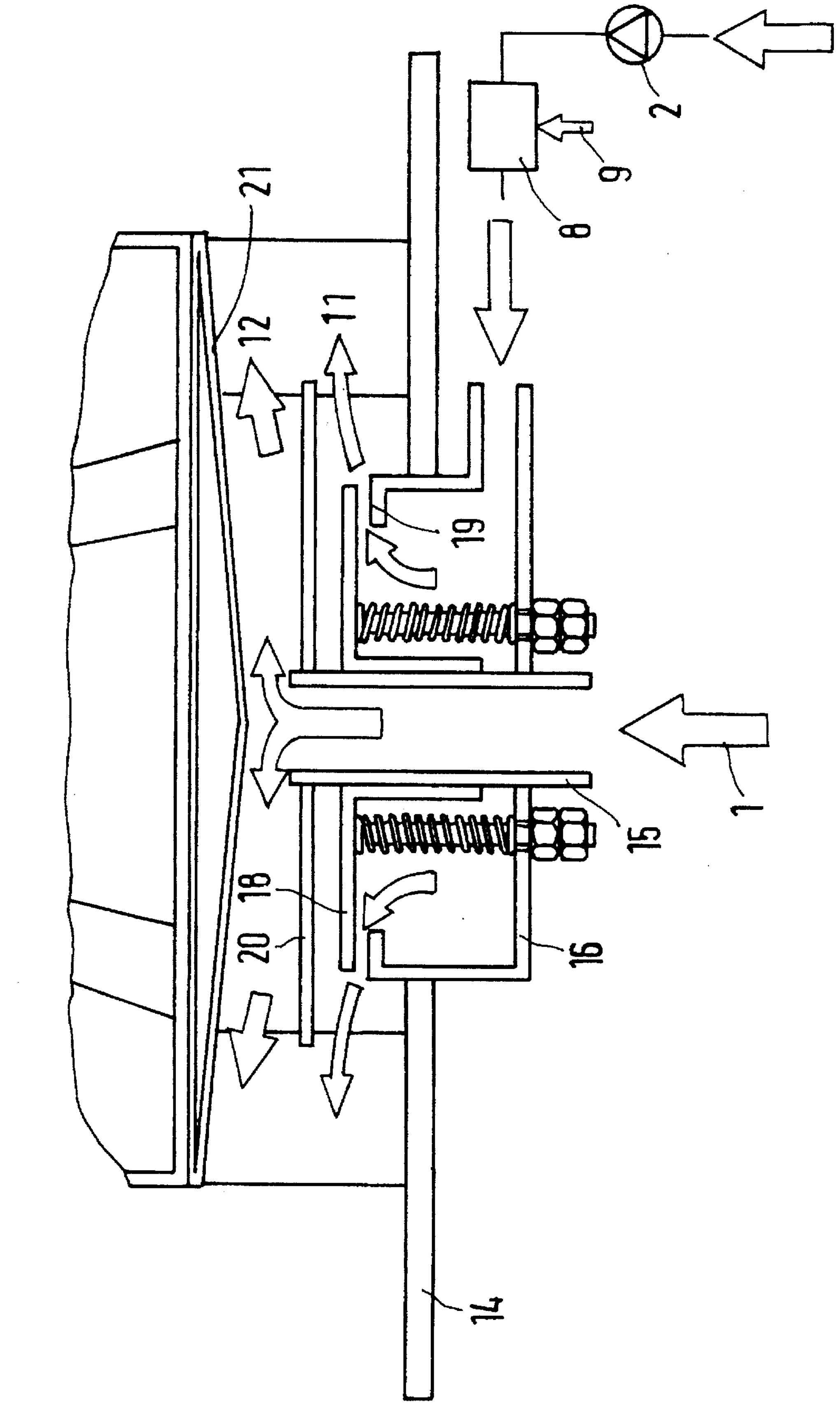
FIG. 3 shows an enlarged section of FIG. 2.

In a preferred specific embodiment shown in FIG. 3, the following elements are arranged concentrically in the center of the flotation tank 14. Disposed centrally there is the inlet pipe 15, via which the raw water 1 containing the flocculated solids is supplied. Disposed concentrically outside the pipe is the so-called mixture inlet 16. The liquid stream 17 to be saturated with gas is pumped, with the aid of a pump 10, into a gas saturation appliance 8 (FIG. 1), the pressure in said appliance 8 being above ambient pressure. Gas saturation of the liquid takes place at the process pressure present. The gas-saturated gas-fluid mixture is then introduced, the elevated process pressure being maintained, via the concentrically arranged mixture inlet 16, decompression taking place radially outwards into the round flotation tank 14 via one or more depressurization elements 18.

The introduced liguid-gas mixture is introduced into the flotation tank 14 via an opening 19 having an adjustable annular gap thereby depressurizing the mixture. The width of the gap can be adjusted by vertical displacement of the depressurization element 18. Alternatively, a plurality of annularly arranged decompression chambers could be provided which may be designed in segment shape. Centrically arranged above the annular gap there is at least one, preferably round, plate-like or annular baffle 20 whose purpose is to convert the gas bubble stream into a uniform horizontal gas bubble flow 11 directed radially outward.

In another preferred embodiment, the baffle 20 is attached directly on the depressurization element 18. The infeed of the raw water 1 preferably takes place via a vertical inlet pipe 15 which is incorporated centrally in the middle of the flotation tank 14 and ends above the depressurization cell 16 or, where present, above the plate-shaped baffle 20. The raw water 1 flowing in vertically must now be converted into a flow directed radially outward, there being installed for this purpose in a preferred specific embodiment, centrically above the inlet, a cone-shaped baffle 21 which opens upward. As the radius increases, this thus results in larger cross sections of flow for the raw water 1 flowing in, which ensures a drop in the velocity of the raw water 1 flowing in. This arrangement ensures that a horizontal two-layer flow 11, 12 directed radially outward is established.

At the end of the plate-shaped baffle 20 there results a mixing zone which is distinguished by the gas bubble flow 11 flowing horizontally outward at the bottom mixing with the raw-water flow 12 flowing outward above it, since the gas bubble flow has a lower density. Gas bubbles attach to the solids in flocculated form and form composites which float up to the liquid surface and form the flotate.

Depending on the size of the tank, one or more annular decompression elements may additionally be fitted at different distances from the center, which elements, for relatively large distances, can be constructed as segmented ring elements. On the surface, the solids floating up form a sludge or so-called flotate layer 23 which is discharged via a skimming appliance and is collected in a centrically placed sludge tank 24 which is emptied via a downpipe 25 directed vertically downwards. A skimming mechanism shown in FIG. 2 is mounted in a revolving framework 26. The discharge of the flotate layer 23 is effected by means of a so-called rotating flotate skimmer 31. The rotational axis of the flotate skimmer 31 is slightly tilted towards the center, where a sludge tank 24 is located. The shaft used is a pipe 32 to which two spiral blades 33 are attached in such a way that the flotate layer 23, after it has been skimmed, arrives in the sludge tank 24 via the pipe 32.

Whereas in previous constructions the spiral blades 33 of the flotate skimmer 31 were designed in such a way that skimming parallel to the water-sludge surface, i.e. skimming at constant depth, was provided for. The skimmer in the embodiment according to the invention is to be designed in such a way that, from the inside to the outside as the radius increases, the skimming depth of the spiral blades 33 also increases, in order to skim off the flotate layer 23, whose thickness increases in an outward direction, in such a way that as little as possible of the liquid phase is discharged.

The rotational speed of the flotate skimmer 31 is a fixed proportion of the speed of revolution of the framework 26, the spiral blade speed being set in such a way that the action or skimming by the spiral blade 33 commences at the point where previously another spiral blade 33 has completed the skimming operation.

Attached to the revolving framework 26 there is a bottom scraper 35 which scrapes the grit deposited by sedimentation into a sediment hopper from which the grit is drawn off or flushed via a cyclically operated waste valve.

Figure 4A:
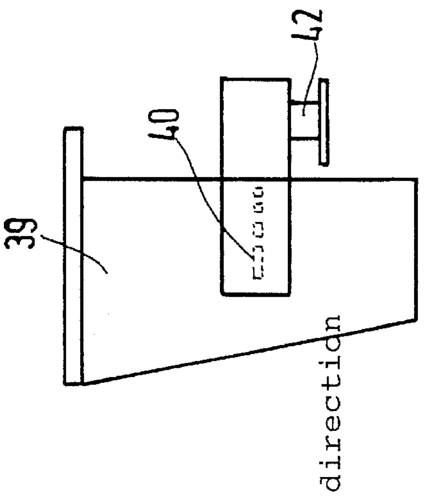
FIG. 4 is a plan view of the flotation tank, and FIG. **4*a* is a side elevational view taken in the direction of arrow A in FIG. 4**.

While a flotate layer 23 is formed in the top zone of the plant from the substances to be separated, there is obtained, in the bottom zone, the liquid phase 38 which is approximately solid-free, e.g. clear water. In a preferable embodiment shown in FIG. 4, an outer, vertical wall 39 of the flotation plant is provided with horizontal slot-like orifices 40 in its bottom zone. On the outside of the slotted tank wall there is at least one collection vessel 41 with collection pipes 42 via which the clear water is discharged from the flotation tank 14. Distributed over the circumference, there are a plurality of such clear water collection vessels 41, the slot-like orifices 40 in the outer wall 39 of the flotation tank 14 being designed in such a way that uniform outflows over the entire circumference of the outer wall 39 is ensured. As shown of FIG. 4*a*, the orifices 40 in the outer wall 39 have a cross section which is the larger the more distant they are from the collection pipe 42 in question. Alternatively or in addition, the number of the orifices 40 can be provided accordingly.

Figure 4:
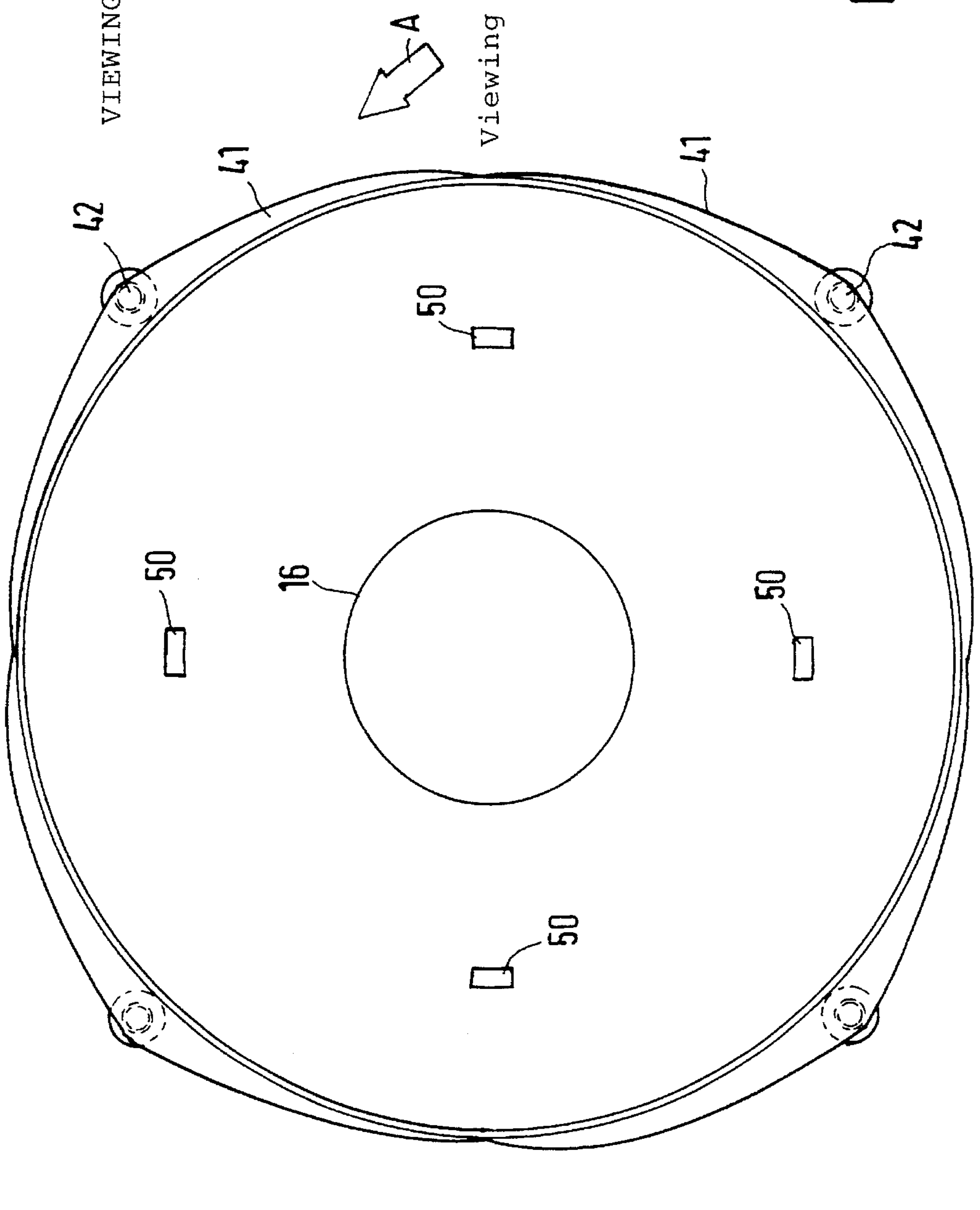

As shown in FIG. 4, it is possible to arrange further mixture inlets 50 radially outside the mixture inlet proper, in order to maintain the increased gas bubble concentration even in the boundary region of the flotation tank 14. These further mixture inlets 50 may form part of an annular delivery element or, as shown in FIG. 4, be constructed as individual elements. The additional mixture inlets 50 are advantageously likewise designed as restrictors for direct decompression of the fluid-gas mixture into the flotation tank 14.

As shown in FIG. 1, it is possible to arrange, in the line from the gas generation appliance 8 to the mixture inlet, a predecompression appliance 51 which effects partial decompression. In this arrangement it is advantageous for the predecompression appliance 51, shown as a restrictor, to be designed as a turbine which is coupled to the pump 10 via a shaft. Thus the power required for operating the pump can be considerably reduced. In this arrangement it is expedient, to supply the above-mentioned additional mixture inlets 50, to branch off downstream of the predecompression appliance 51.

Although the description of the preferred embodiment has been quite specific, it is contemplated that various changes could be made without deviating from the spirit of the present invention. Accordingly, it is intended that the scope of the present invention be dictated by the appended claims rather than by the description of the preferred embodiments.

I claim:

1. Apparatus for separating substances from a liquid by means of dissolved-gas flotation, comprising:

a circular flotation tank, at least one fixed liquid influent inlet located centrally in the tank including means for feeding a flow of an influent liquid radially outwardly into the tank, at least one mixture inlet located centrally in the tank including means for feeding an influent liquid-gas mixture into said tank, said mixture inlet being positioned below said liquid influent inlet, and wherein said mixture inlet comprises depressurization means for at least partial decompression of said liquid-gas mixture, said depressurization means comprising an adjustable depressurization element which defines an annular gap through which the influent liquid-gas mixture passes in an essentially horizontal radially outwardly direction below the flow of said liquid influent into the tank.

2. Apparatus as claimed in claim 1, wherein said liquid influent inlet is arranged centrally in the lower bottom zone of said flotation tank and opens upwardly, and said inlet further comprises a baffle arranged above the open upper end of said influent inlet, said baffle causing deflection of the liquid influent flow in said radial direction.

3. Apparatus as claimed in claim 1, wherein said mixture inlet comprises a plurality of depressurization elements designed as ring segments.

4. Apparatus as claimed in claim 1, further including additional mixture inlet orifices arranged concentrically outwardly of said mixture inlet for additionally feeding liquid-gas mixture into said tank.

5. Apparatus as claimed in claim 1, wherein said mixture inlet has an open upper end opening upwardly, and further including a baffle mounted above the upper end of said mixture inlet.

6. Apparatus as claimed in claim 1, further including a radially extending spiral skimmer mounted for rotation above the flotation tank, said skimmer comprising spiral blades which widen radially outward whereby the skimming level dips in more deeply in an outward direction.

7. Apparatus as claimed in claim 1, wherein said flotation tank includes an outer wall which contains orifices which have cross sections varying in area in the circumferential direction so as to ensure even drainage of clear effluent from the tank.

8. Apparatus as claimed in claim 1, wherein said apparatus is used for separating lipophilic substances from a liquid phase, or for treating wastewater.

9. A process for separating substances from an influent liquid by dissolved-gas flotation, comprising the steps of providing a flotation tank, feeding a liquid influent through a liquid influent inlet located in said flotation tank generally centrally in the tank, said influent inlet including means for feeding a flow of said liquid influent radially outwardly into the tank, separately feeding an influent liquid-gas mixture through a mixture inlet into said flotation tank, and said mixture inlet including means to feed said influent liquid-gas mixture in a horizontally radially outwardly direction below said liquid influent inlet, depressurizing said influent liquid-gas mixture to at least partially decompress said liquid-gas mixture to form gas bubbles to effect the flotation process.

10. The process as claimed in claim 9, wherein a mixing zone is formed in the flotation tank for the liquid influent and the decompressed liquid-gas mixture, whereby gas bubbles which have escaped from the decompressed liquid-gas mixture attach to the substances to be separated off the influent liquid and cause these to float up.

11. The process as claimed in claim 9, wherein there is formed, in the flotation tank, a radial two-layer flow directed generally horizontally outward from the center of the zone, the lower layer essentially containing the liquid-gas mixture and the upper layer essentially containing the liquid influent.

12. The process as claimed in claim 9, wherein a portion of the liquid-gas mixture is additionally admitted radially outward and is decompressed at further points radially removed from the center in the flotation tank.

* * * * *